United States Patent

Sointula

Patent Number: 5,519,711
Date of Patent: May 21, 1996

[54] SWITCH-MODE POWER SUPPLY FOR TIME DIVISION MULTIPLE ACCESS RADIO PHONE SYSTEMS

[75] Inventor: Erkka Sointula, Camberley, United Kingdom

[73] Assignee: Nokia Mobile Phones Ltd., Salo, Finland

[21] Appl. No.: 340,593

[22] Filed: Nov. 16, 1994

[30] Foreign Application Priority Data

Nov. 22, 1993 [FI] Finland .................................. 935182

[51] Int. Cl.$^6$ ............................................. H04B 1/16
[52] U.S. Cl. ..................... 370/95.3; 455/38.3; 455/127; 455/243; 340/825.44
[58] Field of Search ............................. 370/95.3, 29, 9, 370/95.1, 100.1; 379/58, 63; 455/13.4, 38.3, 127, 343, 117, 217, 89; 340/825.44

[56] References Cited

U.S. PATENT DOCUMENTS

| | | | |
|---|---|---|---|
| 4,577,315 | 3/1986 | Otsuka | 370/95.3 |
| 4,903,335 | 2/1990 | Shimizu | 455/343 |
| 4,955,075 | 9/1990 | Anderson | 455/343 |
| 5,140,698 | 8/1992 | Toko | 455/343 |
| 5,193,211 | 3/1993 | Nobusawa | 455/343 |
| 5,212,811 | 5/1993 | Kuge et al. | 455/343 |
| 5,274,369 | 12/1993 | Tsunoda et al. | 455/343 |
| 5,274,843 | 12/1993 | Murai et al. | 455/38.3 |

FOREIGN PATENT DOCUMENTS

| | | |
|---|---|---|
| 0239393 | 9/1987 | European Pat. Off. . |
| 0547803 | 6/1993 | European Pat. Off. . |

OTHER PUBLICATIONS

Texas Instruments, "Advanced Linear European Seminars," 1990, pp. 59–80.
Application No. 935182, Applicant: Nokia Mobile Phones Ltd., dated Apr. 2, 1995.

*Primary Examiner*—Alpus H. Hsu
*Assistant Examiner*—Ricky Ngo
*Attorney, Agent, or Firm*—Perman & Green

[57] ABSTRACT

The present invention relates to a circuit for use in Time Division Multiple Access radio phone systems having transmission and reception cycles. The circuit includes a keyed switch mode power supply of switch-type. The operation of the switch-mode power supply (2) is keyed to take place outside the reception cycles and transmission cycles of the signal.

4 Claims, 2 Drawing Sheets

SWITCH-MODE POWER SUPPLY FOR TIME DIVISION MULTIPLE ACCESS RADIO PHONE SYSTEMS

BACKGROUND OF THE INVENTION

The present invention relates to a circuit used in Time Division Multiple Access radio phone systems for Implementing a keyed switch-mode power supply.

In Time Division Multiple Access radio phone systems, the transmitter is on only part of the time, as for instance in the GSM system (Groupe Special Mobile) about one eighth of the time. Due to the internal resistance of the storage batteries variations in the operating voltage are created at the rate of the keying of the transmission. This causes disturbances in the functions of the transmitter and the receiver. Remedies to the situation can be made by coupling a large-size capacitor in parallel with the storage batteries.

The operating voltage variation caused by the charge state of the storage battery and the compatibility between various types of storage batteries also set limitations to the design and to the energy economy of a device. One known manner to reduce said problems is to use a switch type power source, i.e. a so-called Switched Mode Power Supply (SMPS) between the storage battery and the electronics.

A plurality of methods are known in generating a supply voltage with the aid of switching circuits. Such designs are useful in continuously power consuming products.

The prior art technology is described below referring to the accompanying FIG. 1 which presents a circuit known in the art for generating the operating voltage with the aid of a switching circuit. Various switch mode power supplies known in the art are described for example in reference "Advanced Linear European Seminars for Precision Design of the 90's", published by Texas Instruments UK, 1990, p. 59–82.

FIG. 1 presents a power source 1 supplying direct current to an SMPS 2. An SMPS includes an inductor to which the power is supplied via a switch. When the switched is opened a peak voltage is created by the inductor that charges a capacitor also within the SMPS. The capacitor smooths the output voltage.

Problems are caused by the peak voltages created in the SMPS when the switches therein are switched on and off with the current on. By an a-fold increase of the voltage of the storage battery, the current to be supplied by the storage battery increases a-fold relative to the current to the load. Also the power losses will increase.

In radio phones the above design has not, however, been used in general, primarily due to the electromagnetic interferences it causes, but also because of space constraints, and inefficiency. For high efficiency, the switching times of the power source need to be short, and this in turn increases interferences particularly in analog parts of the phone. In European patent application 92310967.2 "Voltage-Multiplexer" an alternative circuit is disclosed for producing an operating voltage by switching a capacitor charged by the battery into series with the battery to increase the supply voltage. However, in said design the variation in operating voltage caused by the charge state of the storage battery and compatibility problems related to various storage battery types cannot be totally eliminated.

In European patent application EP 239393 "Intermittently driven transmitter" an arrangement is disclosed to implement the power supply of a powerful transmitter with the aid of a capacitance. The design is not, however, as such, appropriate for use in less powerful time-divided radio phone systems.

SUMMARY OF THE INVENTION

In accordance with the invention there is provided e circuit for a radio telephone operable in a time division multiple access system in which respective time slots are allocated for transmission and reception, the circuit comprising a power source regulated by a switch-mode power supply providing peak voltages during operating periods for charging a storage capacitor to a desired power level, and means for controlling operation of the switch-mode power supply such that the switch-mode power supply operates only during periods outside the transmission and/or reception time slots allocated.

Referring once again to the earlier patent application FI-916007, the voltage is increased therein without any stabilization, whereas in the present invention a normal regulation (e.g. pulse-width modulated regulation) is performed in the course of the "on" time.

BRIEF DESCRIPTION OF THE DRAWINGS

The invention is described below in more detail, reference being made to FIGS. 2 to 4 of the accompanying figures, of which.

Embodiments of the present invention are described below referring to FIGS. 2 to 4.

DETAILED DESCRIPTION OF THE INVENTION

Figure 1:
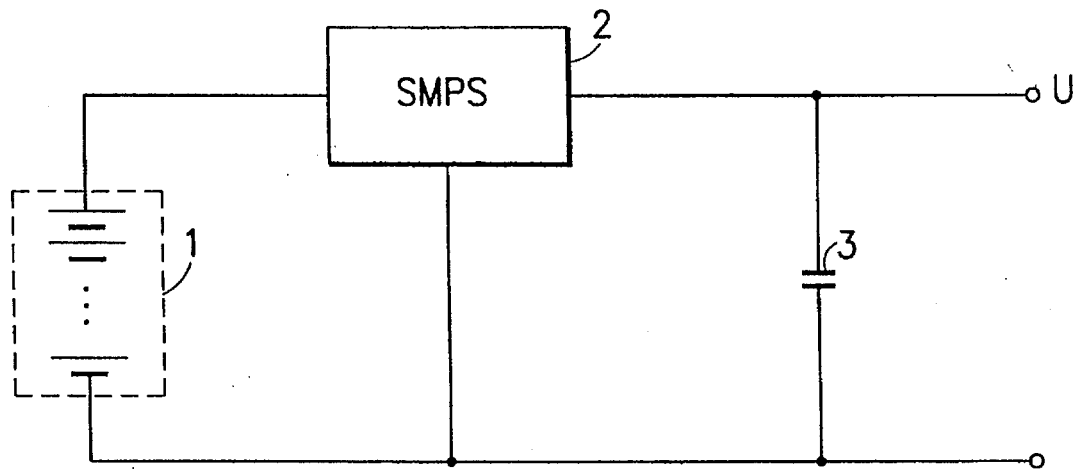
FIG. 1 presents the prior art circuit described above for producing an operating voltage with the aid of an SMPS.
Figure 2:
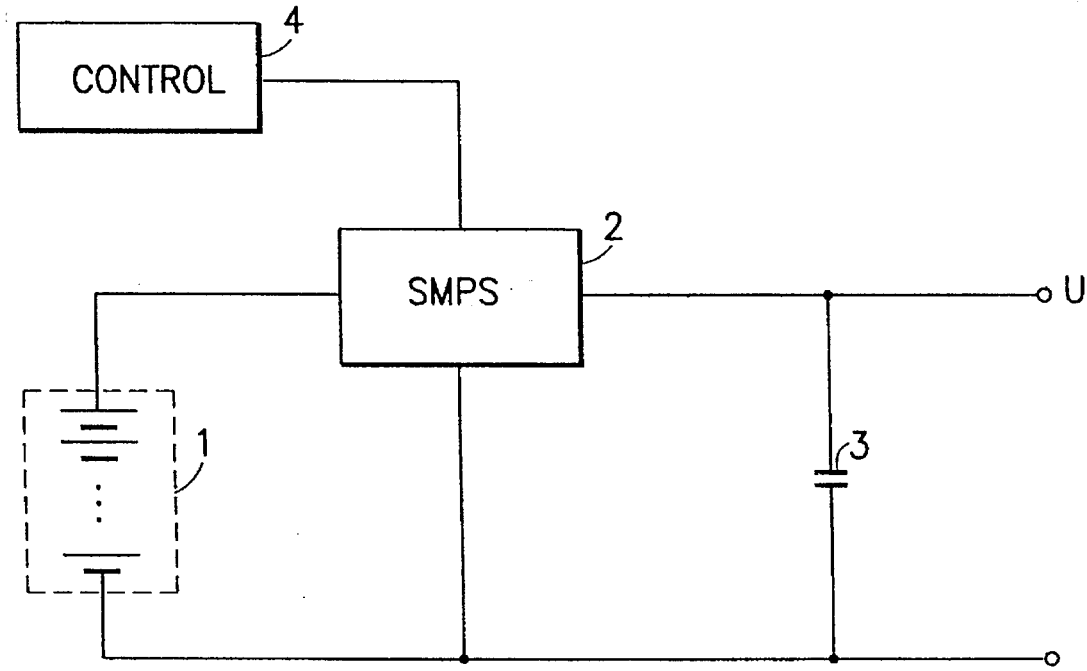
FIG. 2 presents a circuit of an embodiment of the present invention for producing an operating voltage.

FIG. 2 presents e circuit according to the invention for producing an operating voltage particularly for a radio phone. A power source 1 supplies direct voltage to a SMPS 2 which switches the current on and off, thus producing a desired pulsed voltage. The SMPS is controlled with the aid of a control block 4 so that the SMPS is switched off for those time intervals in which a signal is transmitted or received. When both the transmission and reception are switched off, the control block 4 switches the SMPS 2 on and the SMPS 2 stores the power in the capacitor 3. The circuit could, however, be arranged to ensure that the SMPS is only 'on' outside periods of transmission and/or outside periods of reception.

In an embodiment of the present invention, the functioning of said switch type power source in the TDMA phones Is keyed to take place outside the reception and/or transmission cycles. The keying of the operation of the switch-mode power supply 2 can be synchronized with the aid of synchronisation means within the phone for operating in the respective time slots of TDMA. The manner in which such synchronisation could be achieved is well known. Synchronisation using a TDMA frame pulse is mentioned in FI-916007 referred to earlier. The actual period for which the SMPS is 'on' outside the restricted periods is a design option.

Figure 3:
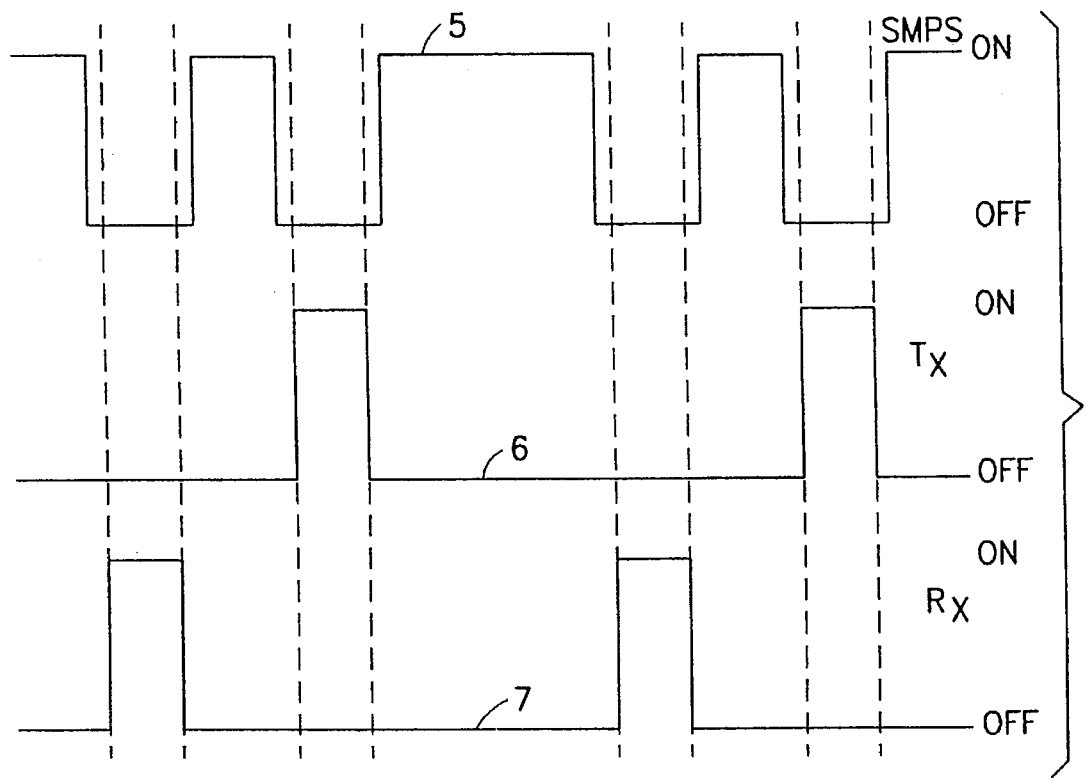
FIG. 3 illustrates the state data of the SMPS, the transmitter and the receiver of a circuit according to the invention as a function of time.

FIG. 3 presents the state data of the SMPS, the transmitter and the receiver of a circuit according to the present invention, as a function of time. The on and off times of the SMPS 2 as a function of time are indicated by numeral 5. The on and off times of the transmitter as a function of time are indicated by reference numeral 6. The on and off times of the receiver as a function of time are indicated by numeral 7.

Thus, energy is stored in capacitors 3 positioned as close to the consumption point as possible. Thus the interferences caused by the power source in the other functions of the phone can be minimized.

Figure 4:
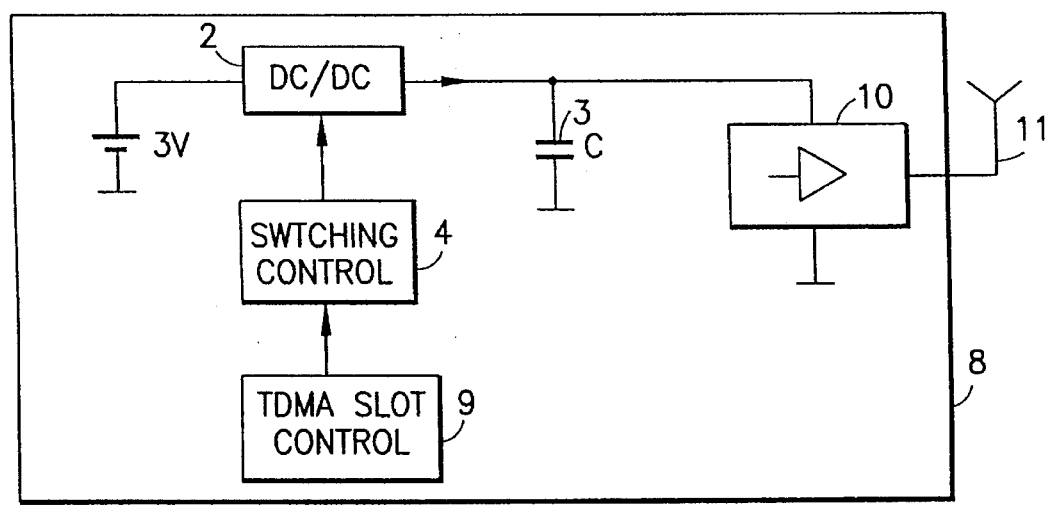
FIG. 4 is a schematic representation of an embodiment of the present invention for powering a cellular telephone.

FIG. 4 illustrates the operation of circuits in accordance with the invention in the context of a TDMA radio telephone 8. A TDMA slot control 9 provides a signal to the switching control 4 which in turn regulates operation of the DC/DC or SMPS 2. The power level generated at the SMPS 2 is transmitted to a load 10. An antenna 11 is used to receive and transmit signals in the respective allocated time slots.

Arrangements in accordance with embodiments of the invention can be implemented for instance in hand phones with the aid of small-size electrolyte capacitors with high capacity and low internal resistance.

In embodiments of the invention, the voltage can be increased and stabilized in a simple manner without electromagnetic interferences (EMI) of the device causing interference during sensitive operational periods, i.e. during reception and transmission.

With the aid of the invention a good efficiency and lack of interference can be provided. When using stabilizing, the TX efficiency can be optimized. The circuit is as simple as possible. The switching component can be integrated into one circuit, e.g. with the power control of the transmitter.

In view of the foregoing description it will be evident to a person skilled in the art that various modifications may be made within the scope of the invention. In particular, the invention could be used in TDMA radio telephone systems other than those operating under the GSM protocol.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

I claim:

1. A circuit for use in Time Division Multiple Access (TDMA) radio phone systems to produce an operating voltage, comprising:

a TDMA radio phone having a transmitter and receiver means for transmitting and receiving TDMA signals during transmission and reception cycles, respectively, a power source (1) for providing a direct voltage signal, a switch-mode power supply (2) connected to said power source (1), a capacitor means (3), connected to said switch-mode power supply (2) for storing energy provided by the power source, and a control means (4) connected to said switch-mode power supply for controlling operation of the switch-mode power supply (2) to switch said switch-mode power supply to operate outside the reception cycles and/or transmission cycles of the transmitted and received TDMA signals.

2. A circuit according to claim 1, wherein said TDMA have frame pulses and said circuit further including synchronization means for switching the a switch-mode power supply (2) to be synchronized with the aid of a TDMA frame pulse.

3. A circuit according to claim 1, wherein the capacitor means (3) connected to said switch-mode power supply (2) includes small-size electrolyte capacitors of high capacity and low internal resistance.

4. A circuit for a radio telephone operable in a time division multiple access system in which respective time slots are allocated for transmission and reception, the circuit comprising:

a storage capacitor, a switch-mode power supply, a power source regulated by the switch-mode power supply for providing peak voltages during operation periods of the radio telephone for charging the storage capacitor to a desired power level, and control means for controlling operation of the switch-mode power supply to operate the switch-mode power supply only during periods outside the transmission and/or reception time slots allocated.

* * * * *